United States Patent [19]

Donatelli et al.

[11] Patent Number: 5,051,224
[45] Date of Patent: Sep. 24, 1991

[54] METHOD FOR MOLDING COMPOSITE ARTICLES

[75] Inventors: Joan M. Donatelli; Godfrey C. Mhah, both of Midland; Sam A. Brady, Kalamazoo, all of Mich.

[73] Assignee: Dow Corning Corporation, Midland, Mich.

[21] Appl. No.: 510,000

[22] Filed: Apr. 17, 1990

Related U.S. Application Data

[60] Division of Ser. No. 387,513, Jul. 28, 1989, Pat. No. 4,973,642, which is a continuation-in-part of Ser. No. 147,349, Jan. 21, 1988, abandoned.

[51] Int. Cl.⁵ .............................................. B29C 43/10
[52] U.S. Cl. .................................... 264/257; 264/141; 264/313; 264/331.11
[58] Field of Search ............................ 528/15, 31, 32; 524/781, 789, 478; 264/257, 314, 316, 552, 546, 572, DIG. 50, 334, 295, 313, 325, 500, 544, 570, 241, 279, 300, 377, 338, 79, 129, 130, 134, 213, 141, 331.11; 425/78, 387.1, 405.1, 405.2, 407, DIG. 14, DIG. 44

[56] References Cited

U.S. PATENT DOCUMENTS

| | | | |
|---|---|---|---|
| 4,670,530 | 6/1987 | Beck | 264/331.11 |
| 4,686,271 | 8/1987 | Beck | 264/331.11 |
| 4,704,240 | 11/1987 | Reavely | 264/102 |
| 4,755,341 | 6/1988 | Reavely | 254/102 |
| 4,755,343 | 7/1988 | Kromrey | 264/102 |
| 4,769,197 | 9/1988 | Kromrey | 264/258 |
| 4,770,835 | 9/1988 | Kromrey | 264/102 |
| 4,795,600 | 1/1989 | Kromrey | 264/257 |

*Primary Examiner*—Jay H. Woo
*Assistant Examiner*—Jeremiah F. Durkin, II.
*Attorney, Agent, or Firm*—Price, Heneveld, Cooper, Dewitt & Litton

[57] ABSTRACT

There is disclosed a trapped polymer method for molding composite articles at temperatures of at least 535° C., comprising heating to a temperature of at least 535° C. a mold containing a master tool, a pre-preg and a trapped polymer comprising a depolymerization-resistant silicone crumb rubber which is resistant to depolymerization of the polymer backbone at a temperature of at least 535° C. to form and cure said pre-preg into the desired composite member.

32 Claims, 1 Drawing Sheet

5,051,224

METHOD FOR MOLDING COMPOSITE ARTICLES

RELATED APPLICATIONS

This is a division of application Ser. No. 07/387,513, filed July 28, 1989 now U.S. Pat. No. 4,973,642, issued Nov. 27, 1990 itself a continuation-in-part of application Ser. No. 07/147,345, filed Jan. 21, 1988, now abandoned.

FIELD OF THE INVENTION

This invention relates to a silicone crumb which is useful as a hydraulic material, especially in composite molding.

BACKGROUND INFORMATION

Materials used in hydraulic systems have been mainly fluid, i.e., gases or liquids. Such systems are used in machines to move parts of equipment, for example, in a hoist to lift automobiles, as brakes and in hydrostatic molding of polymeric materials. Silicone fluids are used in hydraulic systems, but these systems must be closed systems in the same manner as other hydraulic systems using gases or liquids. If the systems using gases or liquids are not closed, loss of material will occur and the effectiveness of the hydraulics is lost.

Other disadvantages of liquids is that if a leak should occur, it may cause undesirable environmental conditions and the cleanup may be difficult. Some liquids may be unstable under high temperature conditions and solidify or deteriorate such that the hydraulic system is ineffective for its purpose.

Integral solid materials which can be deformed have been suggested as useful material for hydraulic purposes, as for example, in methods for thermal expansion molding for composites, i.e., trapped rubber molding. These thermal expansion molding methods use integral solid elastomeric materials in molds to cause pressure against the composite during the molding process. Such thermal expansion molding methods have the disadvantage that the determination of the pressure against the composite is difficult and requires very careful filling of the elastomeric mold portion because either under or over filling can cause unwanted pressures which result in bad composites. Because of the difficulty of using integral solid elastomeric materials in the thermal expansion molding methods, the expense is high enough to cause these methods to be used only in very special applications in which the expense would be acceptable. However, not much is reported for use of integral solid materials for other hydraulic purposes because the solid materials do not flow.

Bruner in U.S. Pat. No. 3,843,601, issued Oct. 22, 1974, describes a hydraulic elastomer which is reported to have a high cross-link density and a high proportion of free chain ends. Bruner crumbles his elastomer under high shear stress to a powder which flows like a viscous fluid through a narrow orifice. Bruner reports that silicone elastomers are desirable materials for their high thermal stability, compressibility and ability to flow under pressure through an orifice. Bruner's hydraulic elastomer is obtained by curing a linear vinyl-containing siloxane copolymer which is made up of dimethylsiloxane units and methylvinylsiloxane units and which has a molecular weight between 20,000 and 200,000 corresponding to viscosities between 1,000 and 1,000,000 centipoise at 25° C. The vinyl present in Bruner's copolymer prior to curing is from 0.1 to 0.9 mole percent Bruner cures his vinyl-containing copolymer with vinyl-specific peroxide, to obtain a high cross-link density product.

To be broadly useful for expansion molding of composites, solid elastomeric crumb materials will require utility at temperatures above about 350° C. Many new curable materials require cure temperatures above 350° C., e.g., at 450° C. or higher. Prior art silicone crumbs, such as those disclosed in Bruner, begin to lose effectiveness as a hydraulic material at temperatures above 350° C. This loss of hydraulic effectiveness is believed to be the result of at least a partial depolymerization of the crumb into a gooey mass comprising a mixture of the diorganosiloxane cyclic oligomers (the precursors of the diorganosiloxane polymer) and the diorganosiloxane polymer which has not depolymerized. An improved hydraulic crumb is therefore desirable, namely, one in which decomposition or degradation of the crumb is minimized or eliminated at the higher temperatures.

SUMMARY OF THE INVENTION

The crumb rubber of the present invention comprises a silicone rubber containing sufficient unreacted vinyl in the polymer chain to absorb heat by further cross-linking, rather than by decomposition of the polymer backbone of the crumb. Preferably, the crumb silicone rubber comprises at least about 20 mole percent unreacted vinyl-containing siloxane units, preferably from about 24 to about 55% and most preferably about 35%.

The term "mole percent vinyl-containing siloxane units" as used herein refers to the percentage of such units relative to the total siloxane units in the vinyl-containing polyorganosiloxane starting polymer from which the crumb is made, disregarding polymer end cap units. In addition, reference to mole percent vinyl-containing siloxane units in the crumb disregards the siloxane units in the polymer bridging material, i.e., the silicon-bonded hydrogen-containing polysiloxane. The term "siloxane unit" refers to a polymeric unit containing a single silicon atom, a single oxygen atom and any organo units appended to the silicon atom.

DESCRIPTION OF THE PREFERRED EMBODIMENTS

Figure 1:
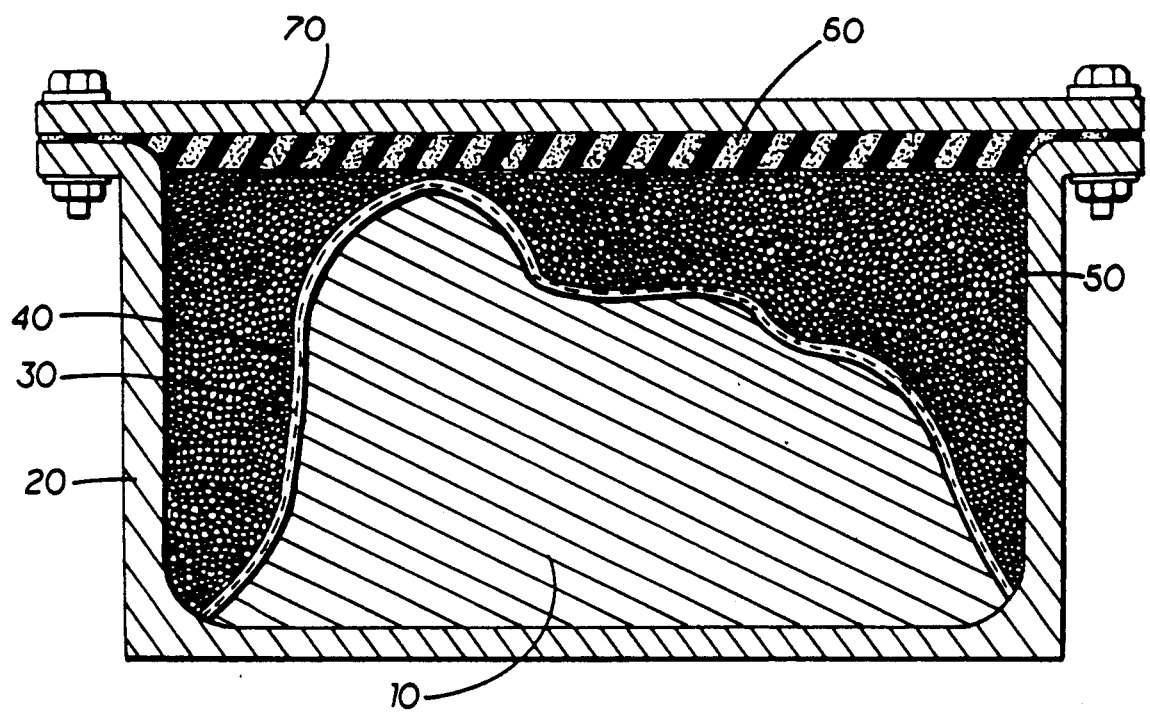
FIG. 1 illustrates the use of the composite rubber of the present invention in composite molding.

The silicone crumb of the present invention is made by curing a composition comprising a (A) vinyl-containing polyorganosiloxane and a (B) silicon-bonded hydrogen-containing polysiloxane with a (C) hydrosilation specific catalyst such as platinum. There is a molar excess of vinyl-containing siloxane units relative to the hydrogen-containing polysiloxane such that a substantial portion of the vinyl bonds remain uncross-linked, i.e., unreacted, after curing. Because cross-linking is promoted by a hydrosilation specific catalyst,.direct vinyl to vinyl cross-linking is avoided during crumb polymerization.

The crumb silicone rubbers of the invention are fully cured silicone polymers which are in or can be easily reduced to particulate, that is, crumbed, form. These crumb rubbers extrude similarly to an uncured caulk and are coalescable when pressurized to form a flowable, essentially void-free medium. The crumb rubbers are characterized by low Young's modulus, low shear strength and a positive coefficient of thermal expansion; with a shore A hardness of about 15 or less. The crumb rubbers are highly friable, that is, their strength is such that moderate size solid particles tend to disintegrate into smaller particles when subjected to modest mechanical forces, including rubbing between the fingers.

The vinyl-containing polyorganosiloxanes of (A) are those which are made up of repeating units of diorganosiloxane units and triorganosiloxy end groups. Other siloxane units can also be present in small amounts if they do not detract from the desired properties. The organic radicals of the polyorganosiloxane can be monovalent hydrocarbon radicals, such as methyl, ethyl, propyl, isopropyl, butyl, octyl, phenyl, vinyl, allyl and cyclohexyl, or monovalent halogenated hydrocarbon radicals, such as chloropropyl, 3,3,3-trifluoropropyl and 2-(perfluorobutyl) ethyl. Preferably, the organic radicals are methyl and vinyl. A sufficient percentage of siloxane units must be vinyl-containing such that in the final product there will be at least 20 mole percent, preferably 25–55% and most preferably 35%, unreacted vinyl-containing siloxane units present. The structural formula for the preferred embodiment vinyl-containing polyorganosiloxane is:

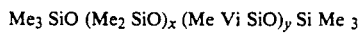

$Me_3 SiO (Me_2 SiO)_x (Me Vi SiO)_y Si Me_3$ where
Me = methyl group
Vi = vinyl group
x = 0 to 75 mole %
y = 25 to 100 mole %
where
x + y = 100 mole %

A portion of the vinyl groups in the vinyl-containing polyorganosiloxane must be cross-linked in order to obtain a crumb rubber material. There must be at least about 1.5, preferably 4, mole percent vinyl-containing polyorganosiloxane for cross-linking. Preferably, not more than 20, most preferably, not more than about 10, mole percent vinyl should be cross-linked. Thus, in order to have at least about 20 mole percent unreacted vinyl as is required in the present invention, the vinyl-containing polyorganosiloxane of (A) must contain at least 21.5, and preferably about 24, mole percent vinyl siloxane units. If the unreacted vinyl- containing siloxane content of the crumb rubber is less than about 20 mole percent, the material does not function well enough in the molding process.

Preferably, the unreacted vinyl content should not be too high. Above 55 mole percent, the material tends to become too hard during the molding process. This may interfere with good pressure distribution during molding. Even so, there are circumstances under which a crumb rubber containing about 90–98 mole percent unreacted vinyl-containing siloxane units can be used to make acceptable parts.

Most preferably, the crumb rubber contains about 35 mole percent unreacted vinyl-containing siloxane units. Allowing for the 1.5 to 20 mole percent cross-linking, the total vinyl siloxane content of the vinyl-containing polyorganosiloxane would be 36.5 to 55 mole percent.

Allowing for at least 1.5 mole percent cross-linking, the polyorganosiloxane (A) should contain at least 21.5 mole percent vinyl-containing siloxane units, preferably 30–60 mole percent and most preferably from about 35–45 mole percent vinyl-containing siloxane units. The total number of polymerized dimethyl containing siloxane units and methylvinyl containing siloxane units in the polyorganosiloxane (A) will be approximately from about 500 to about 650. The molecular weight of the vinyl-containing polyorganosiloxane (A) will be from about 20,000 to about 60,000, preferably 25,000 to 50,000 and most preferably 30,000 to 40,000.

The vinyl-containing polyorganosiloxane compounds (A) are prepared by the base-catalyzed equilibration of a mixture of diorganosiloxane cyclic oligomers, organovinylsiloxane cyclic oligomers and triorganosiloxy-terminated short chain polydiorganosiloxanes in the presence of a fugitive catalyst at a temperature below the decomposition temperature of the catalyst. After the conclusion of the equilibration reaction, the temperature is raised above the decomposition temperature of the fugitive catalyst and it is removed from the reaction zone. Heating of the reacted mixture under reduced pressure is continued for a short time to remove volatile matter, including low-boiling equilibration products and unreacted starting materials.

A fugitive catalyst is employed so that it can be completely removed from the vinyl-containing polyorganosiloxane polymer without being included in the crumb rubber. If a catalyst were used which was not removed, it would attack the siloxane polymer backbone of the crumb rubber as the temperature of the rubber was elevated during use. This would convert the crumb rubber to a goo, rendering it totally ineffective, and possibly creating a fire hazard and/or explosion hazard.

The fugitive catalysts (catalysts which decompose or volatilize at a temperature above that at which they catalyze polymerization, but below that at which depolymerization occurs) which must be employed in forming the vinyl-containing polyorganosiloxane compounds (A) are well-known. Representative of such fugitive catalysts are quarternary phosphonium hydroxides and alkoxides such as tetra-n-butyl phosphonium hydroxide, butyltricyclohexyl phosphonium hydroxide, tetra-n-butyl phosphonium butoxide, quarternary ammonium hydroxides such as tetramethyl ammonium hydroxide and benzyltrimethyl ammonium hydroxide. In addition, the fugitive catalysts can be silanol salts of these hydroxides. A currently preferred laboratory fugitive catalyst is tetramethyl ammonium hydroxide.

The term fugitive catalyst is intended to include catalysts or catalyst systems functionally equivalent to the foregoing in the sense that their catalytic activity is neutralized or removed from the vinyl-containing polymer prior to formation of the crumb. This could conceivably include catalysts different from the foregoing and catalysts which are effectively neutralized or removed in different ways.

Representative polymerization reaction conditions include an equilibration temperature in the range from 80° C. to 130° C., preferably 100° C. to 125° C., for 1 to 8, preferably 2 to 6 hours. After the polymerization reaction is completed, the temperature is raised to the range of 150° C. to 200° C., preferably under vacuum, to remove catalysts and other volatiles.

The silicon-bonded hydrogen-containing polysiloxane of (B) contains at least 0.5 weight percent hydrogen atom and the radicals bonded to the silicon atoms other than hydrogen atoms and divalent oxygen atoms are monovalent hydrocarbon radical or halogenated hydrocarbon radicals which are illustrated above for the polyorganosiloxane of (A). Preferably, the organic radicals are methyl. The preferred polysiloxanes of (B) are the trimethylsiloxy endblocked polymethylhydrogensiloxanes and those most preferred have 1.4 to 1.6 weight percent silicon-bonded hydrogen atoms.

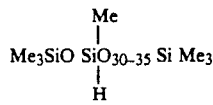

The catalyst (C) is a catalyst specific (or substantially so) for the hydrosilation reaction between the vinyl radicals on the polyorganosiloxane of (A) and the SiH on the polysiloxane of (B), as distinguished from a catalyst which would promote random, uncontrolled direct cross-linking between vinyl groups on adjacent chains of polymer (A). The platinum catalysts are well-known in the art as hydrosilation catalysts and can be selected from any of the variations thereof, with the caveat that the catalyst should be one which is compatible in the mixture of (A) and (B) for even distribution and even cure. The platinum catalysts include chloroplatinic acid and its hexahydrate as described in U.S. Pat. No. 2,823,218, issued Feb. 11, 1958, to Speier et. al., and the reaction products of chloroplatinic acid with vinyl endblocked polysiloxane fluids, such as sym-divinyltetramethyldisiloxane as described by Willing in U.S. Pat. No. 3,419,593, issued Dec. 31, 1968. The platinum catalysts described by Willing which are preferred are those which are complexes of a divinylsiloxane. Other platinum catalysts include the alkene complexes described by Ashby in U.S. Pat. No. 3,159,601, issued Dec. 1, 1964, and in U.S. Pat. No. 3,159,662, issued Dec. 1, 1964; the platinum acetylacetonate described by Baney in U.S. Pat. No. 3,723,497, issued Mar. 27, 1973; the platinum alcoholates described by Lamoreaux in U.S. Pat. No. 3,220,972, issued Nov. 30, 1965, and in many more patents which describe other types of platinum catalysts. The preferred platinum catalysts are those described by Willing.

The mixtures of the present invention can also contain other ingredients, such as fillers. Some fillers may be used in small amounts, such as ground quartz or other nonreinforcing fillers, preferably, less than 5 weight percent. Other ingredients may include heat stability additives, pigments or other colorants, a platinum catalyst inhibitor to retard the hydrosilation reaction at low temperature if necessary. However, the additives or the amounts used should not be detrimental to the desired crumb properties.

The amounts of (B) mixed with 100 parts by weight of (A) should be great enough to give just sufficient cross-linking to create a solid crumb without unduly using up and minimizing unreacted vinyl locations. Typically, this would be from about 1.25 to about 18 parts by weight of the preferred trimethylsiloxy endblocked polymethylhydrogen-siloxanes having 30 to 35 methylhydrogen siloxane units.

The amounts of catalyst (C) mixed with the mixtures of (A) and (B) should be at least one part by weight of platinum element per one million parts by weight of (A) and (B).

The (A) vinyl-containing polyorganosiloxane, (B) silicon-bonded hydrogen-containing polysiloxane, (C) platinum catalyst and, if used, catalyst inhibitor, are combined under shearing conditions to obtain a substantially homogenous blend. Mixing of the blend is continued at room or preferably elevated temperature to effect cure of the blend to the crumb stage. The mixing procedure can be quickly done with ordinary equipment to provide shearing. For example, mixing can be done by hand, as by stirring by a spatula, by air powered propeller mixer or by more sophisticated commercial equipment such as Baker Perkins, Ross or Meyers mixer.

In order to produce a crumb which is useful to transmit pressure evenly throughout, a homogenous cure or cross-link density is desirable. A homogenous cure cannot be obtained if the cross-linking reaction is too rapid and cure domains begin to appear before the ingredients are thoroughly mixed. Thus, it is important that the cross-linking be slow enough at room temperature or the mixing temperature to allow the ingredients to be thoroughly mixed before significant cure takes place..

The substantially homogenous blend can be heated during shearing to shorten the cure reaction time and the crumbing time. Heating is especially required when the ingredients contain a platinum catalyst inhibitor. The heat can be applied by any suitable heating means to the outside of the container for these ingredients being mixed. Heating means are well-known in the art. Preferably, the reaction mixture would be heated under a vacuum to remove hydrogen and volatiles. The temperature when the platinum catalyst inhibitor is used is desirably above 50° C. and can be up to 200° C or higher. The higher temperatures should be used for short periods of time because the composition may result in undesirable side reactions if the heating is continued too long. The heating, mixing and crumbing time can be as short as a few minutes and is preferably less than one hour.

The compositions of the present invention are not tough materials and can be readily formed into crumbs by various techniques, including crumbing by hand. They have little or no measurable tensile strength at break and little or no elongation at break as determined by the test procedure of ASTM-D-412. ASTM-D-412 is a standard test method for rubber properties in tension. Measurements of tensile stress, tensile strength and ultimate elongation are made on specimens which may be in the shape of a dumbbell, ring or straight piece of uniform section and may be of various sizes, that have not been prestressed. The tensile stress and tensile strength are based on the original cross-sectional area of a uniform section of the specimen. Measurement of the tensile set is made after a specimen has been extended and allowed to retract by a prescribed procedure without prestressing. Measurement of set after break is also described. Preferably, the cured product, after being broken into crumbs, is put through a particle sizer, for example, a screen, to make the crumb particles more uniform in size and thus flow better. Such particle distribution of sizes may also be important to conversion of the crumb to the clear liquid appearing state. The sizer can be any of those known in the art, such as screens of various meshes.

The crumb of this invention contains an unusually large number of unreacted vinyl groups, i.e., vinyl groups which have not participated in the cross-linking process. It is thought that this high percentage of unreacted vinyl groups contributes to the resistance of this crumb to decomposition of the polymer backbone chain under high heat and enables the crumb to function for extended periods at substantially higher temperatures than is possible with prior art crumbs. For example, the present crumbs can be used at temperatures above 535° C. without decomposing into a useless goo. The mechanism by which the high vinyl content of the crumb rubbers of this invention is able to protect the siloxane backbone of the polymer from depolymerizing, that is, from being degraded into the original diorganosiloxane cyclic oligomer starting materials, is not understood. It may be that when the crumb rubber is placed in a high thermal flux environment, such as temperatures approaching 650° C., the vinyl groups absorb heat and become thermally cross-linked. It is also possible that the vinyl groups absorb sufficient heat to break the silicon-to-carbon bond of the vinyl group to form new silicon bonds. But whatever the mechanism, the polyorganosiloxane backbone of the vinyl-containing polyorganosiloxane crumb rubbers of the invention does not depolymerize to any substantial degree when exposed to elevated temperatures approaching 650° C.

The total unreacted vinyl-containing siloxane unit content in the final crumb is at least about 20 mole percent with reference to the starting vinyl-containing polyorganosiloxane polymer (A), with more being preferred. At 20 mole percent, the silicone crumb will mold a good part at higher temperatures, but is not typically as satisfactory. Similarly, if the unreacted vinyl siloxane unit content is in excess of 55%, a good part can be made, but the material is not as widely usable as would be the case at about 35% unreacted vinyl.

The crumb of the present invention has an extrusion rate of at least 2 grams per minute, and in the more preferred embodiments at least 5 grams per minute. This extrusion rate is determined by packing the crumb into a Semco plastic tube with an orifice of 0.5 inch. The crumb is then extruded through the orifice for 10 seconds at a pressure of 345 kilopascals. The extruded crumb is weighed and then multiplied by six to get grams per minute. The extrusion rate of the crumb shows the ease with which the crumb can be transferred from one location to another. The extrusion rate also relates to the ease with which the crumb can be transported by pneumatic means. The higher the extrusion rate means the more easily the crumb will flow.

The crumb of the present invention also has compression points of less than 1495 kilopascals for the first two compressions. Compression points are determined by placing the crumb in a 10 milliliter syringe and pressing the plunger at the rate of one inch per minute using a tensiometer. The pressure at which the crumb goes from opaque to clear is recorded as the compression point. The pressure is then released, and the observance is made as to whether the clear material returns to crumb. Every compression and subsequent release of pressure is a cycle. In addition to the first compression, a crumb may be given four cycles. The compression points relate to the ease with which the crumb can be compressed and once in the compressed state, i.e., the clear, liquid appearing state, the pressure applied at any point in the system is transferred equally throughout the clear compressed state in the same manner as it is with a liquid.

The extrusion points of the crumbs of this invention are also determined by placing the crumb in a syringe which has a 1/16 of an inch orifice. The extrusion point is determined by placing the syringe in a compression jig of a tensiometer and compressing at the rate of one inch per minute. The minimum pressure needed to push the crumb through the orifice is the extrusion point. The extrusion point is an indication of the ability of the crumb to leak from openings. The extrusion point also shows that the crumb stays put unless there is force being applied to the crumb and that once the force is removed, the crumb will stop moving.

The crumb of the present invention can be used to control the pressure to a predetermined value by being a readily flowable material and the pressure can be controlled by adding crumb to increase the pressure and removing crumb from the system to reduce the pressure.

A principle use for silicone crumb rubber made in accordance with the present invention is in composite molding. In composite molding, a master tool 10 is placed in a steel mold box 20. Resin impregnated fiberglass, referred to as a "pre-preg" is laid up in a layer 30 on master tool 10. Pre-preg layer 30 is then covered with a layer of aluminum foil 40 and/or other physical barriers which protects the pre-preg from the silicone rubber and vice versa.

Silicone crumb rubber 50 in accordance with the present invention is then loaded into mold box 20. Other layers of crumb rubber in addition to the silicone crumb rubber of the present invention may be arranged in different layers, each layer having somewhat different properties, as desired by the artisan. Optionally, a silicone rubber sponge pad 60 is then laid over the crumb rubber 50 and mold box 20 is covered with a steel cover 70 clamped or bolted thereon.

Mold box 20 is then placed in an oven or is heated by internal heaters and the heated silicone crumb rubber 50 expands with increasing temperature. The pressure from the expanding silicone rubber and the increasing temperature causes the pre-preg to laminate and cure. Pressure is controlled at a desired level by pumping crumb out of or back into, as needed, mold box 20. After the mold box 20 has cooled, cover 70, sponge rubber pad 60, crumb rubber 50 and aluminum protector layer 40 are removed. A molded, composite member formed from pre-preg layer 30 is removed from master tool 10 and box 20.

The crumb of the present invention is more reversion resistant under confined conditions at the same temperature and pressure than the peroxide-cured hydraulic elastomer powder of Bruner. The crumb is also safe and nonintrusive, flowable, pressurizable medium and has high, unique expansion characteristics. These properties are important features for a material which is to be used in a closed system, especially for composite molding systems. The following examples are for illustrative purposes and should not be construed as limiting the present invention which is properly delineated in the claims. The "parts" are parts by weight, unless otherwise stated. The viscosities were measured at 25° C., unless otherwise specified.

EXAMPLE 1

Preparation of the Vinyl Containing Polyorganosiloxane

A mixture of 62.92 parts methylvinylsiloxane cyclic oligomer, 36.02 parts dimethylsiloxane cyclic oligomer and 1.06 parts short chain trimethylsiloxy endblocked dimethylsiloxane and 0.1 part tetramethyl ammonium hydroxide fugitive catalyst was heated at 90° C. for 2 hours. The temperature was then raised to 150° C. for one-half hour to destroy the catalyst, and the system was purged with nitrogen. The product was then stripped at 125° C. at 20 torr to remove a small quantity of volatiles, primarily an equilibrium amount of cyclic siloxanes. The product contains 60 mole percent of vinylmethyl siloxane units.

Following this procedure, a series of vinyl-containing polyorganosiloxane materials having 10, 25, 50 and 100 mole percent vinylmethylsiloxane units, respectively, were prepared.

EXAMPLE 2

Cross-Linking to Form the Crumb

To 100 parts by weight of each vinyl-containing polyorganosiloxane prepared from Example 1 there was added 3.5 parts by weight of a trimethylsiloxy endblocked polymethylhydrogensiloxane having a silicon-bonded hydrogen content of 1.55 weight percent, and 0.35 parts by weight of a complex of chloroplatinic acid and sym-divinyltetramethyldisiloxane, diluted with a siloxane polymer to give 0.7 weight percent platinum element. Each mixture was heated to 125° C. under vacuum (20 torr) and cooled to 35° C. The solid product was broken into fine particles by hand with a spatula.

EXAMPLE 3

Crumb Testing

Crumb rubbers made in accordance with Example 2, were tested for extrusion rate, extrusion point and compression points. The mole percent methylvinylsiloxane units in the starting polymer material (A) for each crumb was as follows: Crumb A, 10 mole percent; Crumb B, 25 mole percent; Crumb C, 50 mole percent; and Crumb D, 100 mole percent. The mole percent unreacted vinyl was in each crumb about 7 mole percent for crumb (A), about 23 mole percent for crumb (B), 49 mole percent for crumb (C) and about 95 mole percent for crumb (D).

Extrusion Rate—Material was packed into a plastic Semco TM tube with an orifice of 0.5". The material was extruded through this opening with a force of 30 psi for 10 seconds. The extrusion was then weighed and the weight multiplied by six to get g/min. This procedure was done three times, and the results are averaged to get the result.

Extrusion Point—This point is the minimum pressure needed to force crumbed rubber through a 1/6" orifice. This was done using a syringe in a compression apparatus for a tensiometer at a compression rate of 1"/min.

Compression Point—Material was placed in a 10 cc syringe and compressed at a rate of 1"/min using a tensiometer. The pressure at which the material went from opaque to clear was noted and the pressure is released This cycle was repeated four times.

| Crumb | | A | B | C | D |
|---|---|---|---|---|---|
| Extrusion rate, g/min | | 1.3 | 2.04 | 2.96 | 84 |
| Extrusion point, kPa | | 1035 | 1242 | 1231 | 838 |
| Compression pts, kPa | 1 | 1150 | 1380 | 1219 | 1346 |
| | 2 | 1047 | 1254 | 1024 | 1242 |
| | 3 | 1047 | 1116 | 1012 | 1208 |
| | 4 | 978 | 1231 | 1024 | 1173 |
| | 5 | 932 | 1116 | 1070 | 1093 |

While all of the four crumbs showed generally satisfactory properties in terms of extrusion rate, extrusion point and compression point, they did not all perform equally well under high temperatures. At 10 mole percent total vinyl siloxane unit content, crumb rubber A decomposed and deteriorated too readily during high temperature compression molding. The material simply did not function well enough in the mold.

Sample B at 25 mole percent total starting polymer vinyl siloxane unit content performed better. On the other hand, crumb C at 50 mole percent starting polymer vinyl siloxane unit content and an unreacted vinyl content of approximately 40 to 45 mole percent performed very well. It performed well during the molding cycle and served as an excellent heat insulator. Crumb D at 100 mole percent starting polymer vinyl siloxane performed satisfactorily under high temperatures, but tended to become too hard in the mold. This tended to interfere with good pressure distribution during molding in the case of some parts.

EXAMPLE 4

Preparation of Vinyl-Containing Polyorganosiloxane Rubbers

A mixture of 464 parts by weight dimethylsiloxane cyclic oligomer, 180 parts by weight methylvinylsiloxane cyclic oligomer, 8 parts by weight short chain trimethylsiloxy-endblocked dimethylsiloxane and 0.7 parts by weight tetramethylammonium hydroxide fugitive catalyst was heated at 90° C. for two hours. The temperature was raised to 150° C. for one hour to destroy the catalyst, and the system was purged with nitrogen. The product was then stripped at 135° C. at 20 torr to remove a small quantity of volatiles, primarily an equilibrium amount of cyclic siloxanes. The product contained approximately 75 mole percent of dimethylsiloxane units and approximately 25 mole percent vinylmethylsiloxane units in the polymer chain.

The thus-prepared vinyl-containing polyorganosiloxane was employed to prepare formulations as follows:

| Ingredient | 3-1 | 3-2 | 3-3 | 3-4 | 3-5 | 3-6 |
|---|---|---|---|---|---|---|
| Vinyl-containing polyorganosiloxane | 100 | 100 | 100 | 100 | 100 | 100 |
| Trimethylsiloxy-endblocked polymethyl-hydrogensiloxane, 1.55 wt % silicon-bonded hydrogen content | 1.0 | 1.5 | 2.0 | 2.5 | 3.0 | 3.5 |
| Complex of chloroplatenic acid and sym-divinyl-tetramethyldisiloxane, diluted with a siloxane polymer to provide 0.7 wt % platinum element | 0.4 | 0.4 | 0.4 | 0.4 | 0.4 | 0.4 |

Each formulation was heated for 10 minutes at 150° C. under vacuum (20 torr) and cooled to 35° C. Formulations 3-2 to 3-6, inclusive, were easily crumbed into fine particles by hand with a spatula. Formulation 3-1 was sufficiently tacky that it could not be crumbed.

The mole percents of reacted vinylsiloxane and unreacted vinylsiloxane units, based on total organosiloxane units in the polymer chain were as follows:

| Formulation | 3-1 | 3-2 | 3-3 | 3-4 | 3-5 | 3-6 |
|---|---|---|---|---|---|---|
| Mole % reacted vinyl | 1.195 | 1.793 | 2.390 | 2.988 | 3.583 | 4.180 |
| Mole % unreacted | 23.805 | 23.209 | 22.610 | 22.012 | 21.417 | 20.820 |

| Formulation | 3-1 | 3-2 | 3-3 | 3-4 | 3-5 | 3-6 |
|---|---|---|---|---|---|---|
| vinyl | | | | | | |

EXAMPLE 5

Preparation of Vinyl-Containing Polyorganosiloxane Crumb Rubber

A mixture of 400 lbs. of a polyorganosiloxane polymer containing 60 mole percent dimethylsiloxane units and 40 mole percent vinylmethylsiloxane units, based on total number of diorganosiloxane units in the polymer backbone, 14.6 lbs. trimethylsiloxy endblocked polymethylhydrogensiloxane having 1.55 wt% silicon-bonded hydrogen content and 1.46 lbs. of a complex of chloroplatinic acid and sym-divinyltetramethyldisiloxane diluted with a siloxane polymer to provide 0.7 wt% platinum content was heated for one hour at 120° C. under vacuum (150 mm Hg). The temperature was raised to 130° C. for an additional 4½ hours at which time 40 lbs. of trimethylsiloxy-endblocked polymethylhydrogensiloxane and 0.22 lbs. of chlorplatinic acid/-sym-divinyltetramethyldisiloxane complex was added to the reaction vessel. The reaction was continued for 30 minutes at 130° C. and 150 mm Hg. The temperature was reduced to 76° C. and the product was removed from the reaction vessel. The product was easily crumbed into fine particles. The vinyl-containing polyorganosiloxane product had 18.5 mole percent cross-linked vinyl, 21.5 mole percent in the polymer chain.

The results of this example demonstrate that good crumb rubber can be prepared at cross-linked vinyl content approaching 20 mole percent.

Of course, it is understood that the above is merely a preferred embodiment of the invention and that various changes and alterations can be made without departing from the spirit and broader aspects thereof.

The embodiments of the invention in which an exclusive property or privilege is claimed are defined as follows.

1. A method of molding a composite member comprising:
   placing a pre-preg over a master tool within an enclosed mold and introducing into said mold, over said pre-preg, a silicone crumb rubber comprising a polymer chain comprising diorganosiloxane units which will expand upon heating and thereby pressurize said pre-preg against said master tool, wherein said silicone crumb rubber comprises at least about 20 mole percent unreacted vinylorganosiloxane units in the silicone crumb rubber polymer chain to prevent depolymerization of the polymer backbone at a temperature of at least 535° C.; heating said tool, pre-preg and said depolymerization-resistant silicone crumb rubber to a temperature of at least 535° C. to form and cure said pre-preg into the desired composite member; cooling said tool, said silicone crumb rubber and said composite member and removing said composite member from said mold.

2. The method of claim 1 wherein said silicone crumb rubber comprises from about 25 to about 55 mole percent unreacted vinyl organosiloxane units.

3. The method of claim 1 wherein said crumb rubber comprises about 35 mole percent unreacted vinylorganosiloxane units.

4. The method of molding a composite member comprising:
   placing a pre-preg over a master tool within an enclosed mold and introducing into said mold, over said pre-preg, a silicone crumb rubber which will expand upon heating and thereby pressurize said prepreg against said master tool, wherein said silicone crumb rubber comprises a vinyl-containing polydiorganosiloxane backbone containing sufficient unreacted vinylorganosiloxane in the polymer chain to prevent depolymerization of the polymer backbone at a temperature of at least 535° C., and sufficient cross-linked vinylorganosiloxane to create a solid crumb material; heating said tool, pre-preg and said depolymerization-resistant silicone crumb rubber to a temperature of at least 535° C. to form and cure said pre-preg into the desired composite member; cooling said tool, said silicone crumb rubber and said composite member and removing said composite member from said mold.

5. The method of claim 4 in which said vinyl-containing polydiorganosiloxane backbone of said silicone crumb rubber comprises at least about 20 mole percent unreacted vinylorganosiloxane units.

6. The method of claim 5 in which from about 4 to about 10 mole percent of said vinyl-containing polydiorganosiloxane backbone polymer of the crumb comprises cross-linked vinylorganosiloxane units.

7. The method of claim 4 in which said vinyl-containing polydiorganosiloxane backbone comprises from about 25 to about 55 mole percent unreacted vinylorganosiloxane units.

8. The method of claim 4 in which said vinyl-containing polydiorganosiloxane backbone polymer of the crumb comprises about 35 mole percent unreacted vinylorganosiloxane units.

9. The method of claim 4 in which from about 4 to about 10 mole percent of said vinyl-containing polydiorganosiloxane backbone polymer of the crumb comprises cross-linked vinylorganosiloxane units.

10. A method of molding a composite member comprising:
    placing a pre-preg over a master tool within an enclosed mold and introducing into said mold, over said pre-preg, a silicone crumb rubber which is resistant to depolymerization of the polymer backbone at a temperature of at least 535° C. and will expand upon heating and thereby pressurize said pre-preg against said master tool, wherein said silicone crumb rubber comprises the cured product obtained by cross-linking:
    (A) a vinyl-containing polyorganosiloxane comprising diorganosiloxane units and triorganosiloxy endblock units, wherein the organic radicals of said diorganosiloxane units are monovalent hydrocarbon radicals or monovalent halogenated hydrocarbon radicals and wherein at least 21.5 mole percent of said diorganosiloxane units comprise vinylorganosiloxane units; with
    (B) a silicon-bonded hydrogen-containing polysiloxane in which the valences of the silicon atoms not satisfied by divalent oxygen atoms or silicon-bonded hydrogen atoms being satisfied by monovalent hydrocarbon radicals or monovalent halogenated hydrocarbon radicals; and using
    (C) a hydrosilation specific catalyst for the hydrosilation reaction of (A) and (B), said cured product having only from about 1.5 to about 20 mole percent of said diorganosiloxane units comprising cross-linked vinyl-containing diorganosiloxane units, leaving the balance of said vinylorganosiloxane units of said vinylorganosiloxane units unreacted; heating said tool, pre-preg and depolymerization-resistant silicone crumb rubber to a temperature of at least 535° C. to form and cure said pre-preg into the desired composite member; cooling said tool, said silicone crumb rubber and said composite member and removing said composite member from said mold.

11. The method of claim 10 wherein the vinylorganosiloxane content of said vinyl-containing polydiorganosiloxane is in the range from 30 to 60 mole percent.

12. The method of claim 10 wherein the vinylorganosiloxane content of said vinyl-containing polydiorganosiloxane is in the range from 35 to 45 mole percent.

13. The method of claim 10 in which said vinyl-containing polydiorganosiloxane has a molecular weight in the range from 20,000 to 60,000.

14. The method of claim 13 wherein the vinylorganosiloxane content of said vinyl-containing polydiorganosiloxane is in the range from 30 to 60 mole percent.

15. The method of claim 13 wherein the vinylorganosiloxane content of said vinyl-containing polydiorganosiloxane is in the range from 35 to 45 mole percent.

16. The method of claim 10 in which said vinyl-containing polydiorganosiloxane has a molecular weight in the range from 25,000 to 50,000.

17. The method of claim 16 wherein the vinylorganosiloxane content of said vinyl-containing polydiorganosiloxane is in the range from 30 to 60 mole percent.

18. The method of claim 16 wherein the vinylorganosiloxane content of said vinyl-containing polydiorganosiloxane is in the range from 35 to 45 mole percent.

19. The method of claim 10 in which said vinyl-containing polydiorganosiloxane has a molecular weight in the range from 30,000 to 40,000.

20. The method of claim 19 wherein the vinylorganosiloxane content of said vinyl-containing polydiorganosiloxane is in the range from 30 to 60 mole percent.

21. The method of claim 20 in which said diorganosiloxane units comprise vinylmethylsiloxane units.

22. The method of claim 21 in which said silicon-bonded hydrogen-containing polysiloxane comprises a polymethylhydrogensiloxane.

23. The method of claim 22 in which there are from about 30 to about ±silicon-bonded hydrogen atoms per molecule of said silicon-bonded hydrogen-containing polysiloxane.

24. The method of claim 23 in which said triorganosiloxy endblock units of said vinyl-containing polydiorganosiloxane comprise trimethylsiloxy endblock units, and in which said polymethylhydrogensiloxane is trimethylsiloxy endblocked.

25. The method of claim 19 wherein the vinylorganosiloxane content of said vinyl-containing polydiorganosiloxane is in the the range from 35 to 45 mole percent.

26. The method of claim 10 in which the silicon-bonded hydrogen-containing polysiloxane is a trimethylsiloxy endblocked polymethylhydrogensiloxane.

27. The method of claim 10 in which there are from about 30 to about 35 silicon-bonded hydrogen atoms per molecule of said silicon-bonded hydrogen-containing polysiloxane.

28. The method of making a silicone crumb comprising mixing and curing under low shear the following ingredients:
(A) a vinyl-containing polyorganosiloxane comprising diorganosiloxane units and triorganosiloxy endblock units in which the organic radicals of said diorganosiloxane units are monovalent hydrocarbon radicals or monovalent halogenated hydrocarbon radicals, and wherein at least 21.5 mole percent of said diorganosiloxane units are vinylorganosiloxane units;
(B) a silicon-bonded hydrocarbon-containing polysiloxane, the valences of the silicone atoms which are not satisfied by divalent oxygen atoms or silicon-bonded hydrogen atoms being satisfied by monovalent hydrocarbon radicals or monovalent halogenated hydrocarbon radicals, said silicon-bonded hydrogen-containing polysiloxane being present in an amount sufficient to cross-link from about 1.5 to about 20 mole percent vinylorganosiloxane units, based on total diorganosiloxane units, of said vinyl-containing polyorganosiloxane;
(C) a hydrosilation specific catalyst for the hydrosilation reaction of (A) and (B), the mixing being continued until a crumb rubber is formed, said crumb rubber having from 1.5 to 20 mole percent of said diorganosiloxane units comprising cross-linked vinyl-containing diorganosiloxane units, leaving the balance of said vinyl groups of said vinylorganosiloxane units unreacted, and wherein the amount of unreacted vinyl in the silicone crumb rubber polymer chain is sufficient to prevent depolymerization of the polymer backbone; and
extruding the crumb through a particle sizer to make uniform particle distribution.

29. The method in accordance with claim 28 in which the ingredients are mixed and heated to shorten the crumb time.

30. The method in accordance with claim 29 further comprising carrying out the crumbing process in a closed chamber and reducing the pressure within the chamber during the crumbing process thereby removing unreacted and unreactable low molecular species and providing a crumb with a low weight loss.

31. The method of making a silicone crumb comprising mixing and curing under low shear the following ingredients:
(A) a vinyl-containing polyorganosiloxane comprising diorganosiloxane units and triorganosiloxy end block units in which the organic radicals of said diorganosiloxane units are monovalent hydrocarbon radicals or monovalent halogenated hydrocarbon radicals, and wherein at least 21.5 mole percent of said diorganosiloxane units are vinylorganosiloxane units;
(B) a silicon-bonded hydrogen-containing polysiloxane, the valences of the silicon atoms which are not satisfied by divalent oxygen atoms or silicon-bonded hydrogen atoms being satisfied by monovalent hydrocarbon radicals or monovalent halogenated hydrocarbon radicals, said silicon-bonded hydrogen-containing polysiloxane being present in an amount sufficient to cross-link from about 1.5 to about 20 mole percent vinylorganosiloxane units, based on total diorganosiloxane units, of said vinyl-containing polyorganosiloxane;
(C) a hydrosilation specific catalyst for the hydrosilation reaction of (A) and (B), the mixing being continued until a crumb rubber is formed, said crumb rubber having from 1.5 to 20 mole percent of said diorganosiloxane units comprising cross-linked vinyl-containing diorganosiloxane units, leaving the balance of said vinyl groups of said vinylorganosiloxane units unreacted, and wherein the amount of unreacted vinyl in the silicone crumb rubber polymer chain is sufficient to prevent depolymerization of the polymer backbone;

wherein said hydrogen-containing polysiloxane contains from about 30 to 35 silicon-bonded hydrogen atoms per molecule; and extruding the crumb through a particle sizer to make uniform particle distribution.

32. The method in accordance with claim 31 further comprising carrying out the crumbing process in a closed chamber and reducing the pressure within the chamber during the crumbing process thereby removing unreacted and unreactable low molecular species and providing a crumb with a low weight loss.

* * * * *